United States Patent [19]

Barwell et al.

[11] 4,190,684

[45] Feb. 26, 1980

[54] METHOD AND APPARATUS FOR APPLYING A RUBBER LAYER TO A CYLINDRICAL WORKPIECE

[76] Inventors: John H. Barwell, 13 Cranmer Rd., Cambridge; Aleksander Wielesiuk, 27 Whitton Close, Swavesey, Cambridgeshire, both of England

[21] Appl. No.: 928,780

[22] Filed: Jul. 28, 1978

[30] Foreign Application Priority Data

Aug. 3, 1977 [GB] United Kingdom ............... 32621/77

[51] Int. Cl.² .......................... B05D 3/02; B05D 3/12
[52] U.S. Cl. .................................... 427/194; 118/101; 118/107; 118/110; 118/112; 118/113; 118/120; 427/355; 427/359; 427/385 R
[58] Field of Search ............... 427/358, 359, 189, 195, 427/194, 355, 385 R; 118/101, 107, 120, 112, 110, 113

[56] References Cited

U.S. PATENT DOCUMENTS

| | | | |
|---|---|---|---|
| 3,857,362 | 12/1974 | Brooks | 118/101 X |
| 3,900,595 | 8/1975 | Giori | 427/358 X |

*Primary Examiner*—Michael R. Lusignan
*Attorney, Agent, or Firm*—Merchant, Gould, Smith, Edell, Welter & Schmidt

[57] ABSTRACT

Rubber is applied to a cylindrical workpiece by a feed surface arranged to form a nip with the workpiece into which the rubber is caused to be drawn by movement of the feed surface along the workpiece. The resulting compression of the rubber in the nip renders the rubber plastic so that the rubber flows onto the workpiece to form a layer of thickness determined by the spacing of the feed surface from the workpiece on the workpiece surface. The layer of rubber is then smoothed either by roller or smoothing plate and is then vulcanized.

17 Claims, 7 Drawing Figures

METHOD AND APPARATUS FOR APPLYING A RUBBER LAYER TO A CYLINDRICAL WORKPIECE

BACKGROUND OF THE INVENTION

1. Field of the Invention

This invention relates to a method and apparatus for applying a layer of unvulcanised rubber, thermoplastic or similar material to a cylindrical workpiece, e.g. a steel roller.

Throughout this specification the term 'rubber' will be used to mean unvulcanised rubber, thermoplastic or similar material and the term workpiece will be used to mean any cylindrical body which requires to be covered with an even layer of rubber material.

2. Description of the Prior Art

Known methods of roller covering are either labour intensive (e.g. building pre-extruded or pre-callendered sheet onto the workpiece by hand, either as one piece or in strips or layers) or may require expensive and complex capital equipment (e.g. special extruders designed to extrude rubber directly onto the workpiece). These known methods also suffer from particular deficiencies in that it is often difficult to avoid the inclusion of air blisters as the rubber is applied and it is only possible to achieve a rough surface finish. Both of these classes of deficiency can create a high production reject rate and call for a high volume of secondary finishing work (e.g. surface grinding) in order to produce satisfactory finished goods.

SUMMARY OF THE INVENTION

The invention provides a method of applying a layer of rubber to a cylindrical workpiece comprising the steps of locating a feed surface adjacent the workpiece with the feed surface converging towards the workpiece in one direction along the workpiece axis to form a nip with the workpiece, rotating the workpiece about its axis, delivering rubber between the workpiece and feed surface, moving the feed surface along the workpiece in the opposite direction to said one direction as the workpiece rotates, compressing and rendering the rubber in the nip between the feed surface and workpiece plastic to form a layer of rubber around the workpiece having a generally uniform thickness determined by the size of the nip.

Between the feed surface and the workpiece mastication of the rubber takes place as it is applied to the workpiece and simultaneously it is formed to the required thickness and surface finish. The mastication and the consequent shearing action in the rubber create high local working pressures, thus giving good conditions to exclude air blisters and bond the rubber to the workpiece. Furthermore, the freshly worked rubber is in a good condition for working to close dimensional tolerances and high standards of surface finish, thus requiring little secondary finishing work.

The layer of rubber may be subjected to a smoothing operation after application to the roller.

For example the layer of rubber may be smoothed by rolling the rubber.

Alternatively the layer may be smoothed by frictional engagement with a smoothing surface.

In any of the above methods the rubber may be delivered in strip or granule form between the workpiece and feed surface.

The rubber between the workpiece and feed surface may be heated to assist in rendering it plastic.

Also in any of the above methods the surface of the roller may be pre-heated to facilitate bonding of the plastic rubber to its surface.

In the case where the applied material has thermoset characteristics, the rubber may be subjected to a cross-linking process, such as the vulcanization of conventional rubber after coating on the workpiece.

The invention also provides an apparatus for performing the above method comprising means for supporting and rotating a cylindrical workpiece about its axis, a plate providing the feed surface, means to mount the plate for movement parallel to the axis of rotation of the workpiece, the plate being supported with one end nearer the axis than the other to provide said nip with the workpiece surface and means to deliver the rubber to the feed surface as the workpiece rotates and the plate is moved along the workpiece.

The plate may have a wall at the end remote from the workpiece axis which extends towards the axis to constrain the rubber delivered to the feed surface of the plate at that end of the plate.

Preferably the plate is convexly curved towards the workpiece axis.

The plate may embody a heater for heating the rubber moving over its surface.

In an alternative arrangement the feed surface of the plate has a nylon coating to facilitate movement of the rubber over the surface of the plate.

The invention further provides an apparatus for performing the above method comprising means for supporting and rotating a cylindrical workpiece about its axis, a tapered roller mounted for rotation about a parallel axis adjacent the workpiece surface so that the tapered surface of the roller forms a surface which converges in one direction with the surface of the workpiece and terminates in the nip between the roller and workpiece, means to feed rubber between the roller and workpiece and means to traverse the roller parallel to the workpiece axis in a direction opposite to said one direction as the workpiece rotates to apply a layer of rubber to a workpiece.

Means may be provided for smoothing the surface of the rubber layer applied to the workpiece after application by the feed surface.

The means for smoothing the surface of the rubber may comprise a roller having a cylindrical surface for engaging the surface of the rubber on the workpiece and rotatable about an axis parallel to or slightly inclined with respect to the workpiece axis.

Alternatively the means for smoothing the surface of the rubber applied to the workpiece may comprise a smoothing plate mounted to engage the surface after application by the feed surface.

DESCRIPTION OF THE PREFERRED EMBODIMENTS

Figure 1:
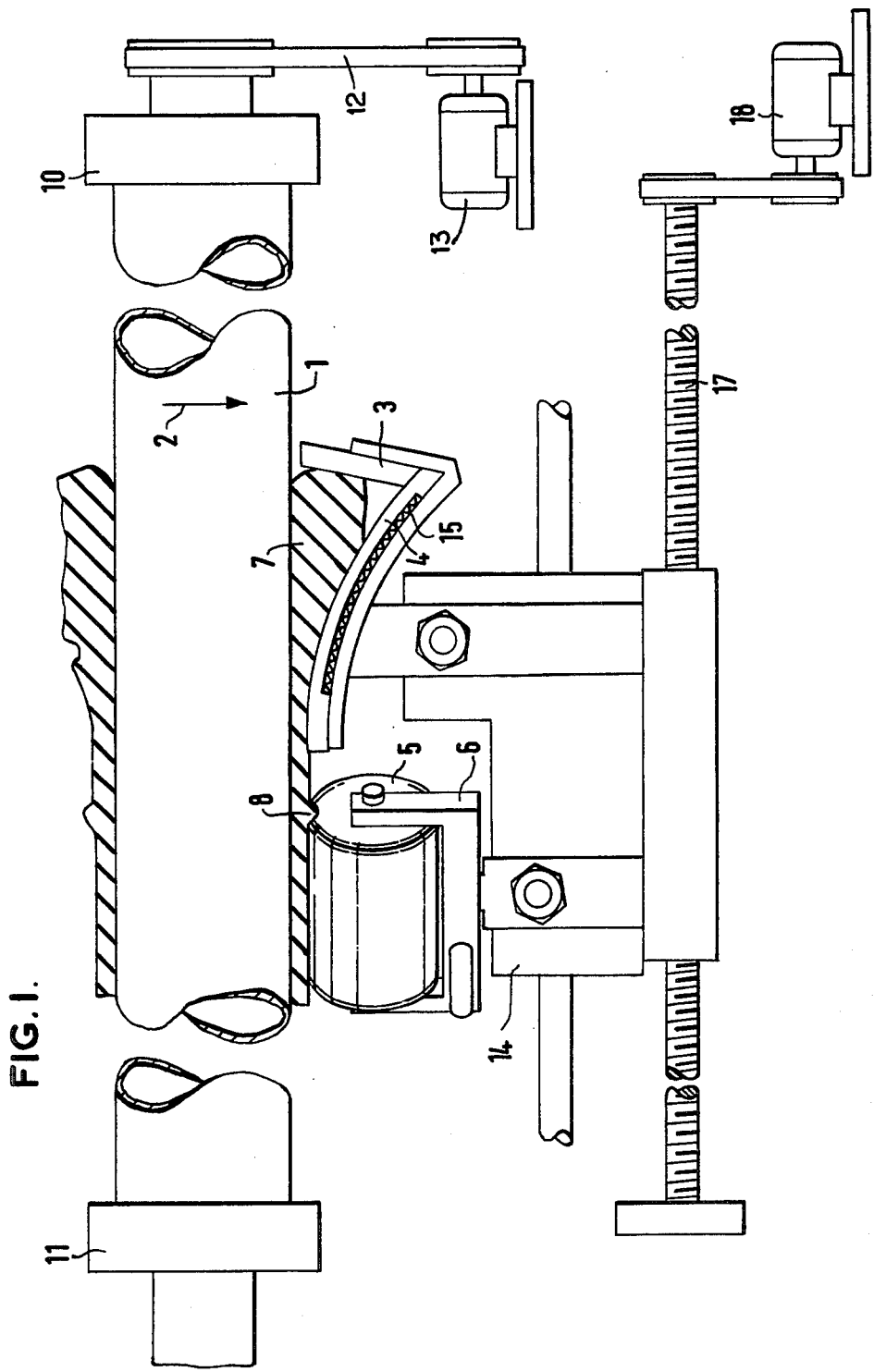
FIG. 1 is a plan view, showing a workpiece partly covered with rubber, together with the transverse block and finishing roller.
Figure 5:
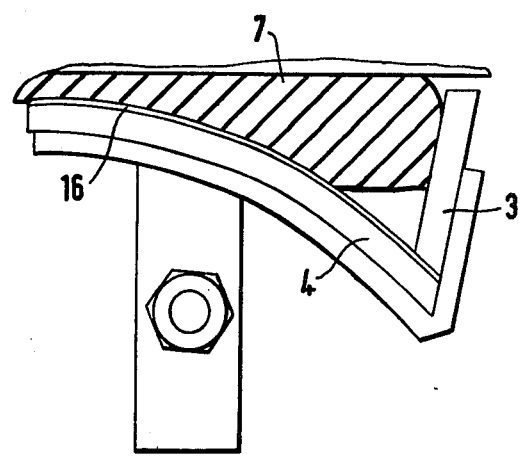
FIGS. 5 to 7 show various modified arrangements.

Referring to FIG. 1 of the drawings, there is shown a workpiece 1 in the process of being covered with rubber. The workpiece 1 is mounted in chucks 10, 11 of a lathe. One chuck 10 is connected by a belt drive 12 to an electric drive motor 13 for turning the workpiece in the direction of the arrow 2. Mounted on a cross-slide 14 of the laths is a traverse block, carrying a fence 3 and a curved plate 4 which is heated by a resistance heater 15. Instead of the resistance heater, the plate 4 may be provided with a smooth nylon surface as shown at 16 in FIG. 5. Beside the traverse block there is a finishing roller 5 mounted in a stirrup 6 which can be rotated about the axis "C"—"C" so that the angle of the line of contact between the finishing roller and the newly applied rubber is adjustable. The cross-slide is moved parallel to the lathe axis by a lead screw 17 driven by a motor 18.

In operation, strips of rubber are fed into the gap between the curved plate 4 and the workpiece 1.

Alternatively, granulated material may be fed into the aforementioned gap. The surface of the workpiece is previously prepared by known means to cause rubber to bond to the surface of the workpiece. In the case where the workpiece is a steel roller, the surface preparation may comprise surface grinding/shot blasting followed by degreasing to provide a chemically clean surface followed by painting of the surface with a proprietory bonding agent. The strip or supply of granules, is thus drawn into the aforementioned gap, or nip, and a rolling bank of rubber 7 is formed in the gap. The traverse block is, in effect so angled to the workpiece that as it is traversed along the workpiece it causes a bank of rubber to travel along with it. The traverse block is traversed along the workpiece (to the right in FIG. 2) by the lead screw at controlled speed and rubber is prevented from escaping ahead of the traverse block by the fence 3. The gap between the traverse block and the workpiece is adjustable by means of the cross-slide to accommodate different sized workpieces and different covering thickness requirements.

Figure 2:
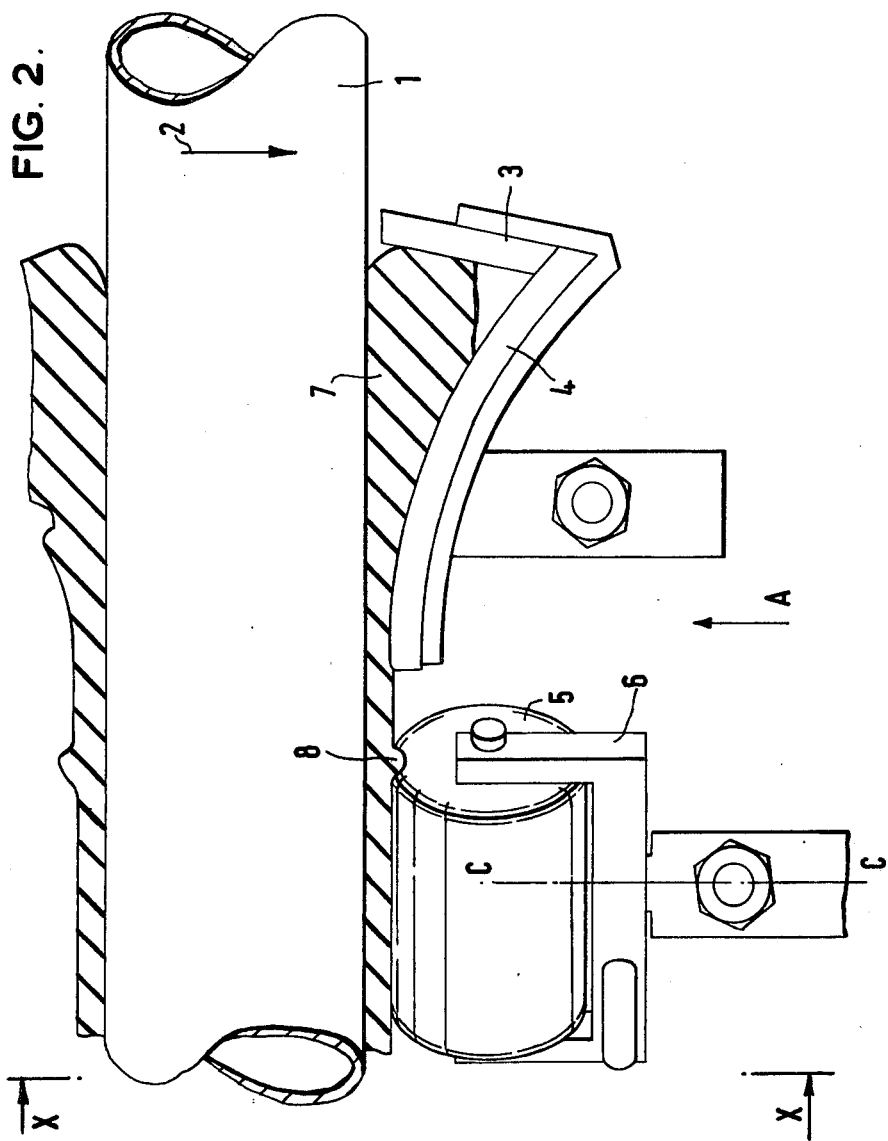
FIG. 2 is a more detailed view of part of the arrangement of FIG. 1.
Figure 3:
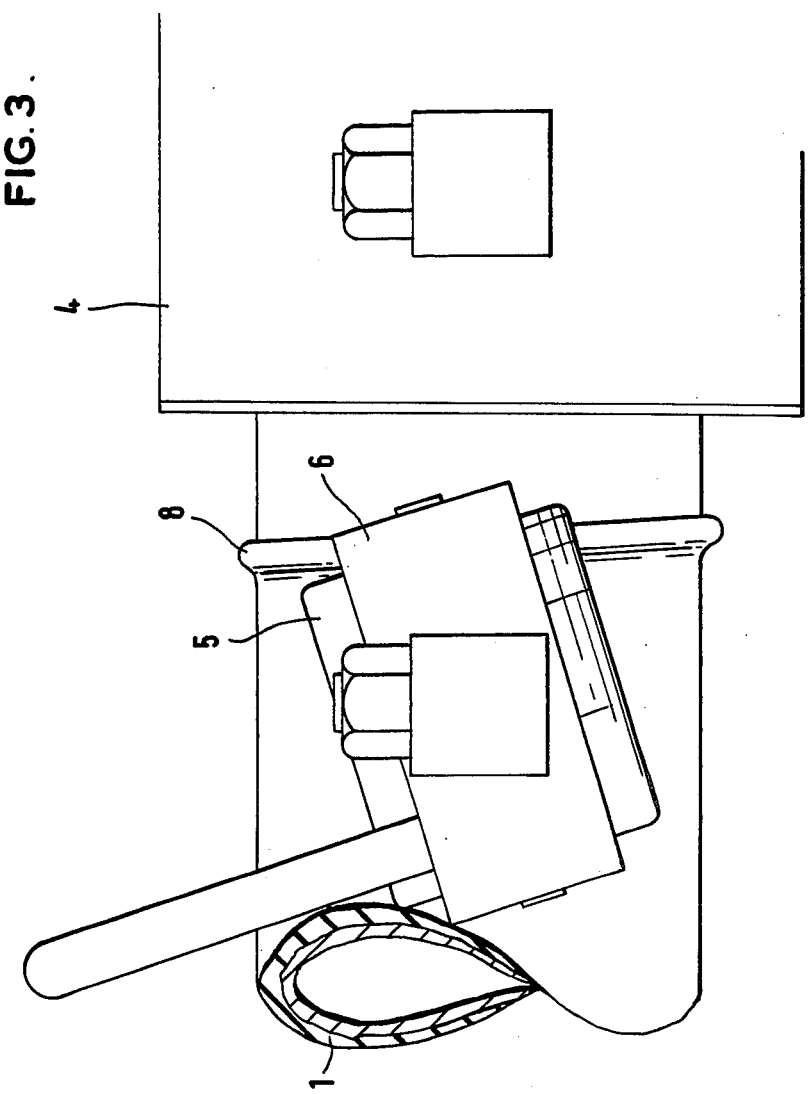
FIG. 3 is an elevation viewed from the direction "A" in FIG. 2.
Figure 4:
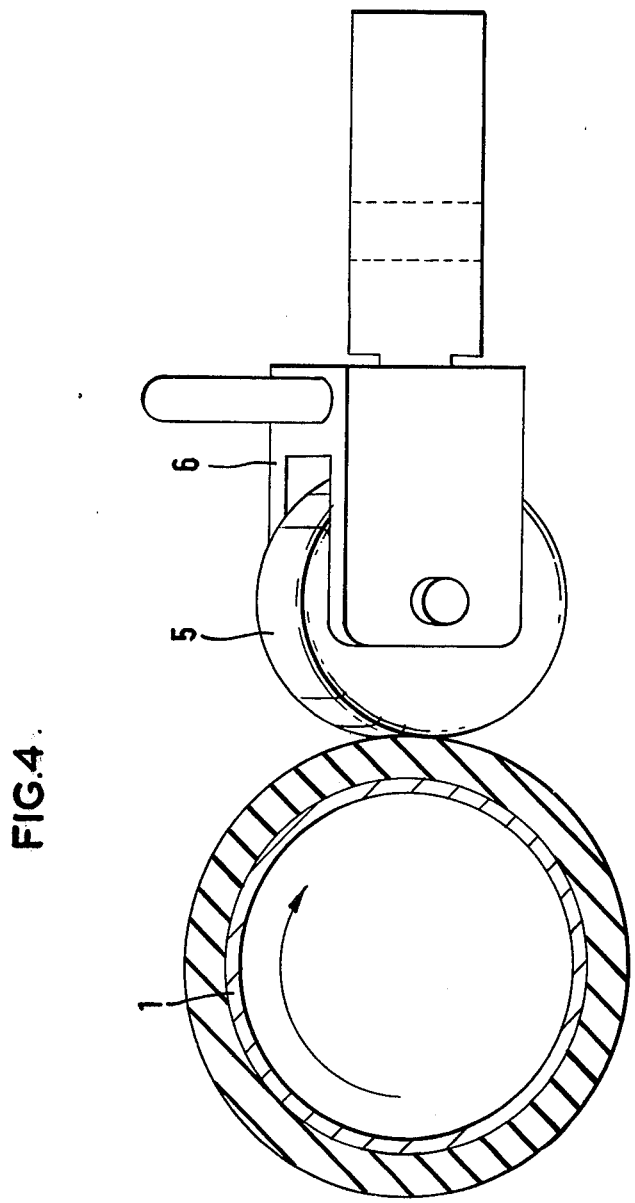
FIG. 4 is a section through "X"—"X" in 25 FIG. 2.

The action of the traverse block is thus to cause a layer of rubber, of appropriate thickness, to be uniformly and progressively applied under high working pressure to the workpiece, but due to the frictional drag between the traverse block and the freshly applied rubber a further operation may be required to achieve a satisfactory surface finish. This further operation is accomplished, simultaneously with the application of the rubber, by means of the finishing roller 5 which is rigidly mounted adjacent to the traverse block and thus follows up the traverse block. The action of the finishing roller is to cause a secondary working in the outer surface of the freshly applied rubber and thus achieve a smooth surface. To accomplish this satisfactorily the line of contact of the finishing roller to the workpiece is inclined upwards in the direction of traverse, as shown in FIG. 2 and the angle of inclination may be adjustable during operation so that a small secondary bank of rubber 8 may be formed at its leading edge. The leading and trailing edges of the finishing roller are suitably angled or radiussed so that no mark is left by the finishing roller.

The start and finish of the applied rubber may be trimmed by knives, which may be mounted to the lathe chassis (not shown). The workpiece is then removed from the laths and the rubber is vulcanised (if necessary) in an autoclave.

Figure 6:
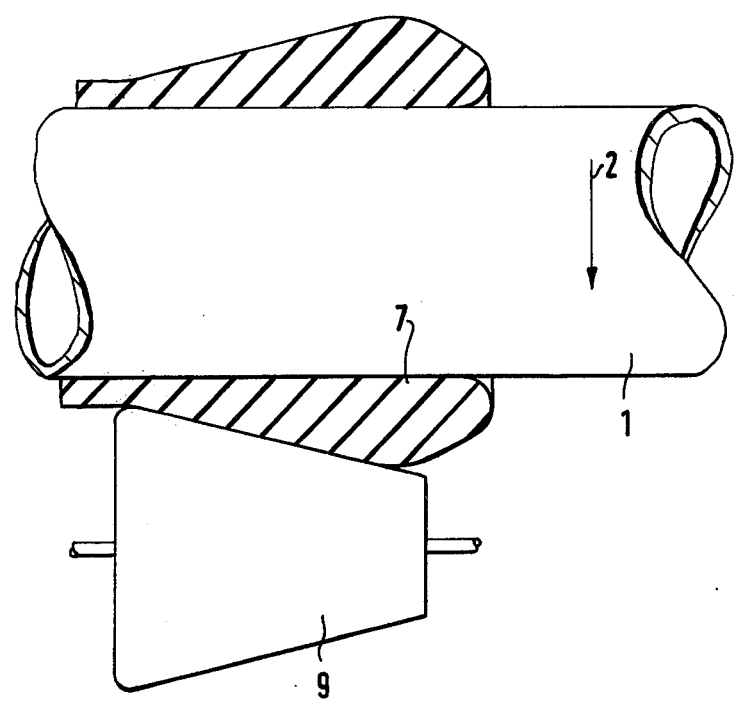

In a modification of the apparatus described above the curved plate 4 and the fence 3 may be replaced by a tapered roller 9 (FIG. 6). The tapered roller 9 is mounted on the cross-slide 14 for rotation about an axis parallel to the centre-line of the lathe such that the roller tapers to the right as shown in the drawing. In this case also a rolling bank of rubber 7 is formed between the tapered roller and the workpiece 1. The tapered roller may be heated or may have an outer layer of material such as nylon.

Figure 7:
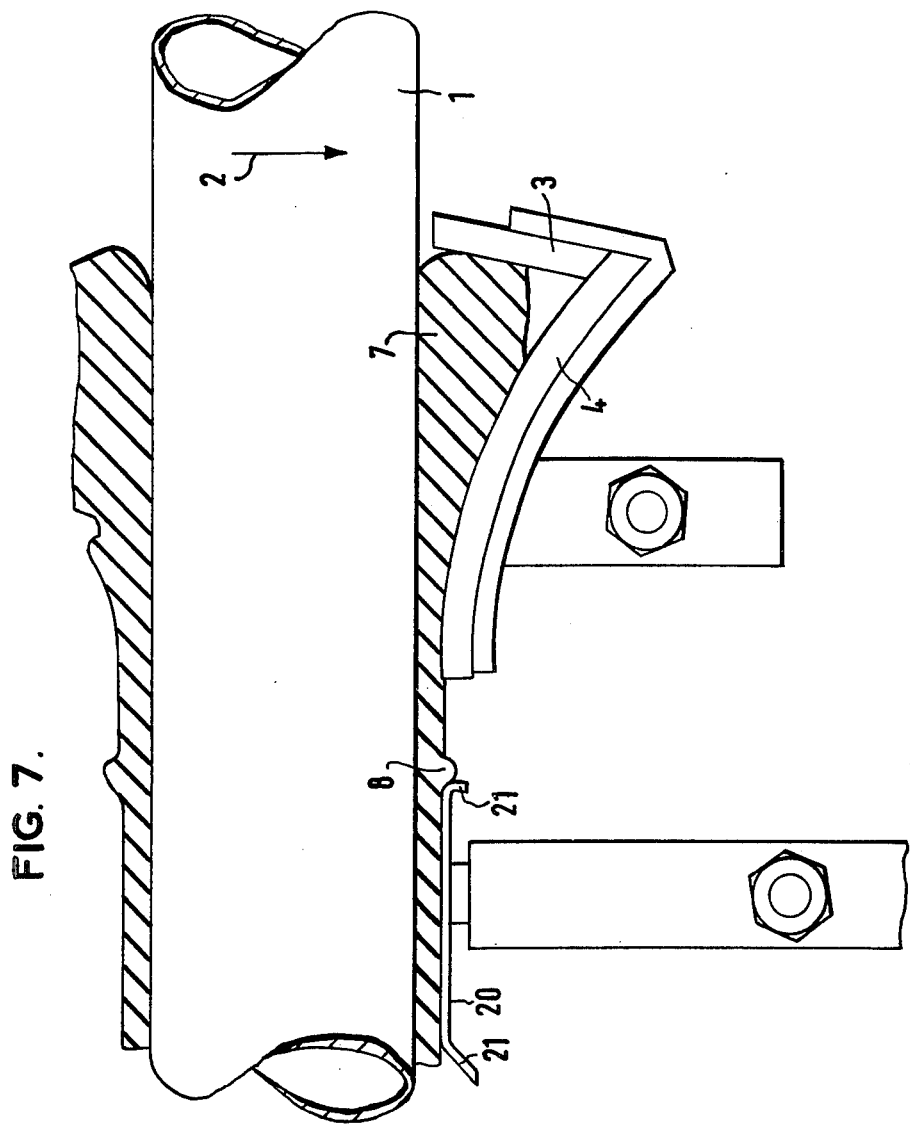

In another modification of the apparatus shown in FIG. 7 the finishing roller 5 is replaced by a smoothing plate 20 rigidly mounted adjacent to the traverse block or tapered roller 9. The edges 21 of the smoothing plate may also be suitably angled or radiussed so that no mark is left by the smoothing plate.

The method could be used to re-coat a previously coated roller or re-tread certain types of rubber tyre. In this case, an outer, worn layer of rubber would be removed by buffing, peeling or grinding to expose a clean, freshly cut rubber surface and a rubber solution (cement) may be applied by brush or spray before the new rubber is applied. In some circumstances and with some types of rubber the application of cement would be avoided and the bond between the new and the old rubber would be achieved and enhanced by the high application pressures achieved with the above method.

We claim:

1. A method of applying a layer of rubber to a cylindrical workpiece having a longitudinal axis therethrough comprising the steps of: locating a feed surface adjacent to and spaced from the workpiece with the feed surface converging towards the workpiece to form a nip with the workpiece, rotating the workpiece about its axis, delivering rubber into the nip between the workpiece and feed surface, and moving the feed surface along the length of the workpiece in a direction parallel to the axis of the workpiece, thereby compressing and rendering the rubber in the nip between the feed surface and workpiece plastic to form a layer of rubber around the workpiece having a generally uniform thickness determined by the size of the nip.

2. A method as claimed in claim 1 wherein the layer of rubber is subjected to a smoothing operation after application to the roller.

3. A method as claimed in claim 2 wherein the layer of rubber is smoothed by rolling the rubber.

4. A method as claimed in claim 2 wherein the layer of rubber is smoothed by frictional engagement with a smoothing surface.

5. A method as claimed in any one of claims 1, 2, 3 or 4 wherein the rubber is delivered in strip or granule form between the workpiece and feed surface.

6. A method as claimed in claim 1 wherein the rubber between the workpiece and feed surface is heated to assist in rendering it plastic.

7. A method as claimed in claim 1 wherein the surface of the roller is pre-treated to facilitate bonding of the plastic rubber to its surface.

8. A method as claimed in claim 1 and in the case where the rubber is a natural rubber wherein the rubber is subjected to a vulcanising operation after coating on the workpiece.

9. An apparatus for applying a layer of rubber to a cylindrical workpiece having a longitudinal axis therethrough, comprising: means for supporting and rotating the cylindrical workpiece about its axis; a plate providing a feed surface, means for mounting the plate for movement parallel to the axis of rotation of the workpiece thereof along the entire length of the workpiece, and wherein the plate is supported with one end nearer to the axis of the workpiece than the other end of the plate to provide a nip between the plate and the workpiece, whereby rubber delivered into the nip of the feed surface is applied in a layer uniformly to the workpiece as the workpiece rotates and the plate is moved along the workpiece.

10. An apparatus as claimed in claim 9 wherein the plate has a wall at the other end thereof which is remote from the workpiece axis which extends towards the axis to constrain the rubber delivered to the feed surface of the plate at that end of the plate.

11. An apparatus as claimed in claim 9 or claim 10 wherein the plate is convexly curved towards the workpiece axis.

12. An apparatus as claimed in claim 9 wherein the plate embodies a heater for heating the rubber moving over its surface.

13. An apparatus as claimed in claim 9 wherein the feed surface of the plate has a nylon coating to facilitate movement of the rubber over the surface of the plate.

14. An apparatus for applying a layer of rubber to a cylindrical workpiece having a longitudinal axis therethrough, comprising means for supporting and rotating a cylindrical workpiece about its axis, a tapered roller mounted for rotation about an axis which is parallel to the workpiece axis, wherein the roller is spaced from and adjacent to the workpiece so that the tapered surface of the roller forms a feed surface which converges towards a surface of the workpiece and terminates in a nip between the roller and workpiece, and means for traversing the roller along the length of the workpiece in a direction which is parallel to the workpiece axis as the workpiece rotates to apply a layer of rubber to the workpiece.

15. An apparatus as claimed in claim 9 or claim 14 wherein means are provided for smoothing the surface of the rubber layer applied to the workpiece after application by the feed surface.

16. An apparatus as claimed in claim 15 wherein the means for smoothing the surface of the rubber comprise a roller having a cylindrical surface for engaging the surface of the rubber on the workpiece, and further including adjustable support means for the roller to permit the axis of the roller to be adjusted with respect to the workpiece axis.

17. An apparatus as claimed in claim 15, wherein the means for smoothing the surface of the rubber applied to the workpiece comprise a smoothing plate mounted to engage the surface after application by the feed surface.

* * * * *